(12) United States Patent
Emo et al.

(10) Patent No.: US 8,867,161 B2
(45) Date of Patent: Oct. 21, 2014

(54) SHINGLED MAGNETIC RECORDING WITH VARIABLE TRACK SPACING

(71) Applicant: Seagate Technology LLC, Cupertino, CA (US)

(72) Inventors: Bruce Emo, Longmont, CO (US); Ken R. Burns, Cannon Falls, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/835,628

(22) Filed: Mar. 15, 2013

(65) Prior Publication Data

US 2014/0268394 A1    Sep. 18, 2014

(51) Int. Cl.
*G11B 5/027* (2006.01)
*G11B 15/18* (2006.01)
*G11B 20/12* (2006.01)

(52) U.S. Cl.
CPC .................. *G11B 20/1217* (2013.01)
USPC ............................. 360/58; 360/71

(58) Field of Classification Search
None
See application file for complete search history.

(56) References Cited

U.S. PATENT DOCUMENTS

| 6,185,063 | B1 | 2/2001 | Cameron |
| 6,437,947 | B1 * | 8/2002 | Uno ........................... 360/78.04 |
| 7,133,241 | B2 | 11/2006 | Che et al. |
| 7,440,221 | B2 | 10/2008 | Tsuchinaga et al. |
| 7,486,460 | B2 | 2/2009 | Tsuchinaga et al. |
| 7,830,632 | B2 | 11/2010 | Tang et al. |
| 7,965,465 | B2 | 6/2011 | Sanvido et al. |
| 8,014,097 | B1 * | 9/2011 | Sanvido ......................... 360/60 |
| 8,190,945 | B2 | 5/2012 | Nadeau et al. |
| 8,223,458 | B2 | 7/2012 | Mochizuki et al. |
| 8,599,507 | B2 * | 12/2013 | Sanvido et al. ................ 360/31 |
| 8,638,514 | B2 * | 1/2014 | Sato et al. ..................... 360/48 |
| 2002/0067567 | A1 | 6/2002 | Szita |
| 2012/0250174 | A1 | 10/2012 | Sueishi et al. |

* cited by examiner

*Primary Examiner* — K. Wong
(74) *Attorney, Agent, or Firm* — Hall Estill Attorneys at Law

(57) ABSTRACT

Apparatus and method for writing data to a data storage medium using shingled magnetic recording (SMR). In accordance with some embodiments, a transducer is positioned adjacent a recording medium. The transducer is used to write data to the medium in the form of partially overlapping tracks grouped together into bands so that a first track and a last track in a selected band are wider than remaining tracks in the selected band.

20 Claims, 8 Drawing Sheets

SHINGLED MAGNETIC RECORDING WITH VARIABLE TRACK SPACING

SUMMARY

Various embodiments of the present disclosure are generally directed to shingled magnetic recording on a data storage medium.

In accordance with some embodiments, a transducer is positioned adjacent a recording medium. The transducer is used to write data to the medium in the form of partially overlapping tracks grouped together into bands so that a first track and a last track in a selected band are wider than remaining tracks in the selected band.

These and other features and aspects which characterize various embodiments of the present invention can be understood in view of the following detailed discussion and the accompanying drawings.

DETAILED DESCRIPTION

Figure 1:
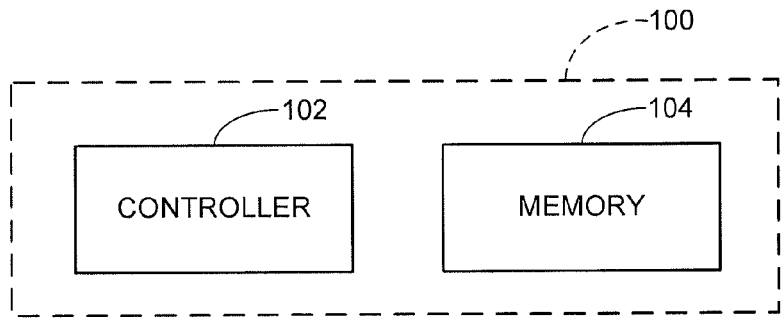
FIG. 1 is a functional representation of a data storage device.

The present disclosure generally relates to the storage of data on a data storage medium using shingled magnetic recording.

Shingled magnetic recording (SMR) generally involves writing data to a rotating magnetic recording medium in such a way that subsequently written tracks of data partially overlap previously written tracks. The tracks may be arranged into bands of concentric tracks. Small inter-band gaps may be provided between adjacent bands.

The data are written to and read from an SMR media surface using a data transducer. The data transducer may have separate write and read elements. A variety of transducer configurations can be employed with SMR media such as perpendicular magnetic recording, heat assisted magnetic recording (HAMR), magneto-resistive (MR) sensing, etc.

An actuator is used to move the transducer radially across the media surface. A linear actuator advances the transducer substantially along a radial line. A rotary (swing arm) actuator pivots adjacent the medium so that the transducer follows an arcuate path across the media surface.

It is common for the write element to have an effective magnetic field write width that is substantially greater than the effective magnetic sensing read width of the associated read element. This allows a first track to be written with an initial, relatively wider width established in relation to the width of the write element. A second track having the same width as the first track may be written that overlaps a portion of the first track. The portion of the first track that is not overwritten becomes the final first track and has a final width that is generally equal to or slightly greater than the width of the read element. A third track is next written that partially overwrites the second track to define the final second track, and so on.

In some cases, the write element may have an asymmetric magnetic field write response such that a fringing field on one side of the write element is relatively wider than the fringing field on the opposing side of the write element. The asymmetric write response may be a function of the construction of the write element. The use of a rotary actuator can induce changes in skew angle between the read and write element across the radius of the medium, and changes in skew angle can also induce and/or change write asymmetry.

For a given radial position on the medium, the direction of writing may be selected such that the portion of a previous track that is overwritten by a subsequent track is that portion associated with the side of the transducer having the wider fringing field. Some SMR writing schemes employ different directions of overwriting at different radial locations of the medium.

The use of SMR can increase the data storage capacity of a magnetic recording surface. Narrowing the widths of the final tracks to match the read element width allows more data tracks to be placed within a given area. However, SMR write techniques can also suffer a number of limitations.

One limitation that has been observed is an increase in bit error rate for the first track written in each band. Unlike the remaining tracks in the band that are overwritten (squeezed) by only a single adjacent track, the first track in each band is usually immediately adjacent the last written track in the next band. It follows that the first track in each band may be squeezed from two opposing directions; that is, the first written track in each band may be partially overwritten by both the second track in the band and the last track in the adjacent band.

Accordingly, various embodiments disclosed herein are generally directed to an apparatus and method for carrying out shingled magnetic recording to a data storage medium. As explained below, some embodiments employ a write controller adapted to a position a write transducer to sequentially write data from a first written track to a last written track in a selected band on the medium so that each successively written track in the selected band partially overlaps an immediately previously written track. The write controller adjusts a centerline of at least the first written track in a radial direction away from the second written track so that at least the first and last tracks in the band are wider than remaining tracks in the band.

In some embodiments, the radial position of the first written track in the band is adjusted so as to have a centerline that is nominally the same distance to the centerlines of both the second written track in the band and the last written track in the immediately adjacent band. This provides a track pitch value for these tracks that is greater than the track pitch for the remaining pairs of tracks in the band, and the system operates with two track pitch offset values.

In other embodiments, both the first and second tracks in the band are moved in a direction toward the last written track in the previous band. As before, this provides a track pitch value for these tracks that is greater than the track pitch for the remaining pairs of tracks in the band. This approach provides at least three distinct track pitch offset values. In each case, every track in the band has a minimum spacing between its immediately adjacent tracks sufficient to ensure adequate data recovery.

Over time, the repeated exposure of a portion of the first written track in the first band to the fringe field when the last track of the prior band is written may tend to degrade the read response of the first written track. Accordingly, in further embodiments this situation is monitored such that the writing of data to the last track in the prior band may be followed by a rewriting of all of the data in the first band. The decision to rewrite the first band may be carried out in response to a measured parameter such as a selected number of N writes to the last written track or an observed change in readback characteristics of the first written track, etc.

These and other features of various embodiments disclosed herein can be understood beginning with a review of FIG. 1 which provides a functional block representation of a data storage device 100. The device 100 includes a controller 102 and a memory 104. The controller 102 can take a variety of forms such as a hardware based control circuit or a general purpose programmable processor having suitable programming to provide top level control for the device. The memory 104 can take a variety of forms and is contemplated to employ shingled magnetic recording (SMR).

Figure 2:
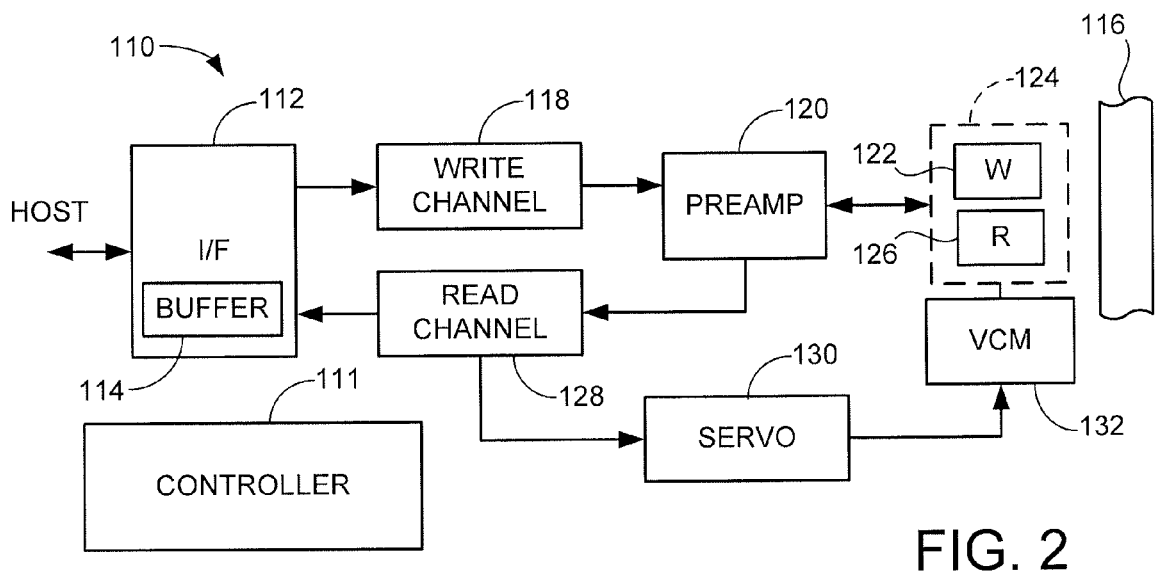
FIG. 2 is a functional representation of another data storage device.

FIG. 2 is a functional block diagram for a data storage device 110 that may correspond to the device 100 of FIG. 1 in accordance with some embodiments. The data storage device 110 is characterized for purposes of the present disclosure as a hard disc drive (HDD) that employs perpendicular magnetic recording to store data from a host device (not separately shown). Such is merely exemplary and is not limiting.

The device 110 in FIG. 2 includes a top level controller 111 that may be realized in hardware or firmware. An interface circuit (I/F) 112 communicates with the host device and includes a data buffer 114 to temporarily store data pending transfer between the host device and a rotatable perpendicular data recording medium 116.

A write channel 118 operates to encode input write data from the host to provide a serialized data stream to a preamplifier/driver (preamp) 120. The preamp 120 provides a sequence of write currents to a perpendicular magnetic write element (W) 122 of a data transducer 124 to write data to the medium 116.

During a readback operation, readback signals are transduced by a magneto-resistive (MR) read element (R) 126 of the data transducer 124. The transduced signals are supplied to the preamp 120. The preamp 120 conditions and amplifies the readback signals and provides the same to a read channel 128. The read channel 128 applies signal processing techniques to recover the originally stored data to the buffer 114 pending subsequent transfer to the host.

During both read and write operations, specially configured servo positioning data provided to the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116.

Figure 3:
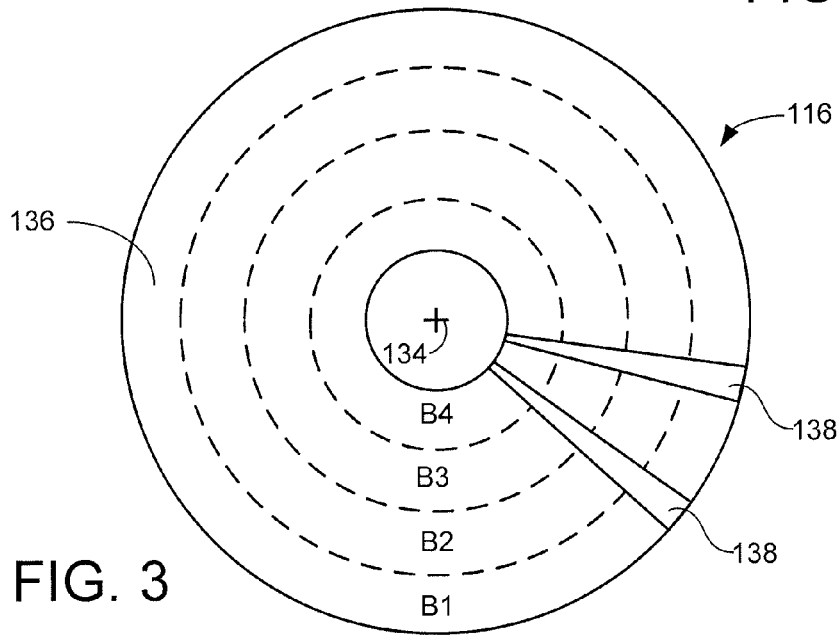
FIG. 3 depicts a storage medium adapted for shingled magnetic recording (SMR).

FIG. 3 depicts an arrangement of the medium 116 of FIG. 2 in accordance with some embodiments. The medium 116 is characterized as a perpendicular magnetic recording disc which is rotated at a selected rotational velocity by a spindle motor (not shown) about a central axis 134.

The data tracks are grouped together into a number of bands 136. Four such bands are illustrated in FIG. 3 and denoted as bands B1-4. Each band 136 comprises a grouping of concentric data tracks (not separately shown in FIG. 3). Those skilled in the art will appreciate that any number of bands, including hundreds or thousands (or more) of concentric bands, may be defined on each medium surface as desired.

While not limiting, the writing of data sets can be arranged so as to occur with different bands 136; that is, the bands 136 can be predefined or adaptively defined during operation, with each set of new data written successively to a new band. Previously written data may be moved to a new, different band 136 for data management purposes. Bands having a large number of successive access (read and/or write) operations may be rewritten in place or moved to a new location.

FIG. 3 further shows the medium 116 to have a number of servo wedges 138 which are arrayed in spaced apart fashion around the circumference of the medium 116, much like spokes of a wheel. While only two servo wedges 138 are depicted in FIG. 3, it will be appreciated that several hundred such wedges (or more) may be provisioned around the medium as desired. User data are written to sectors in the bands 136 in the area between adjacent pairs of the servo wedges 138. The servo wedges 138 provide the requisite servo positioning control data to the servo circuit 130 (FIG. 2) to facilitate precise positioning of the respective read and write elements over the respective bands 136.

The servo positioning information can take a variety of forms such as Gray code addresses, dibit (e.g., ABCD) servo patterns, etc. The servo data may be printed during disc manufacture, formed during servo writing (including through the use of a multi-disc writer, MDW), written by the device 110 during a self-servo writing operation, etc. Other forms and types of servo systems can be used.

Figure 4:
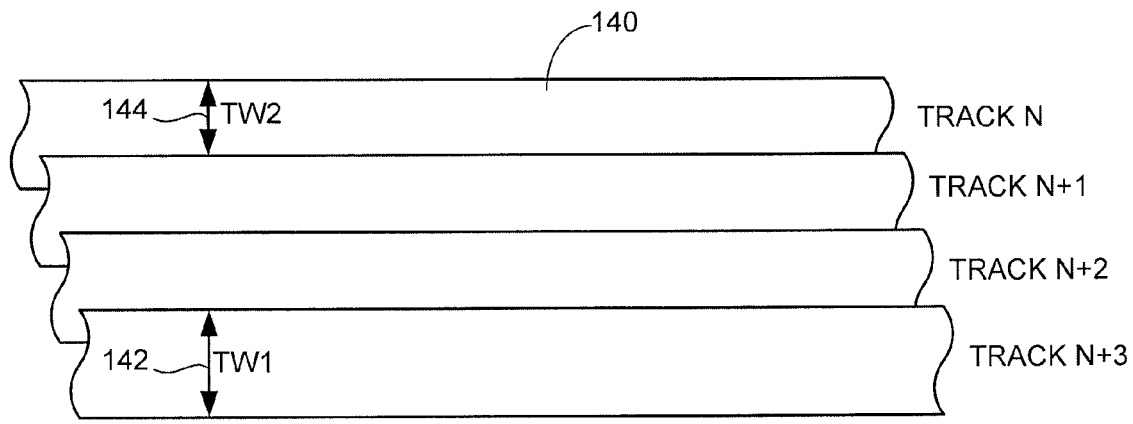
FIG. 4 shows an arrangement of shingled (partially overlapping) data tracks.

The tracks in each band 136 are shingled, or partially overlap, as generally illustrated in FIG. 4. More specifically, FIG. 4 shows a total of four shingled tracks 140, with individual track addresses arbitrarily identified as Track N to Track N+3. Track N is written first, followed successively by Track N+1, Track N+2 and Track N+3. Each successively written track 140 partially overlaps the previously written track. As initially written, each track has an initial track width TW1 denoted at 142, which corresponds to the effective magnetic field write width of the write element 122 (FIG. 2). Once shingled, each track has a final track width TW2 denoted at 144, which corresponds to the effective magnetic field sensor width of the read element 126 (FIG. 2).

Figure 5:
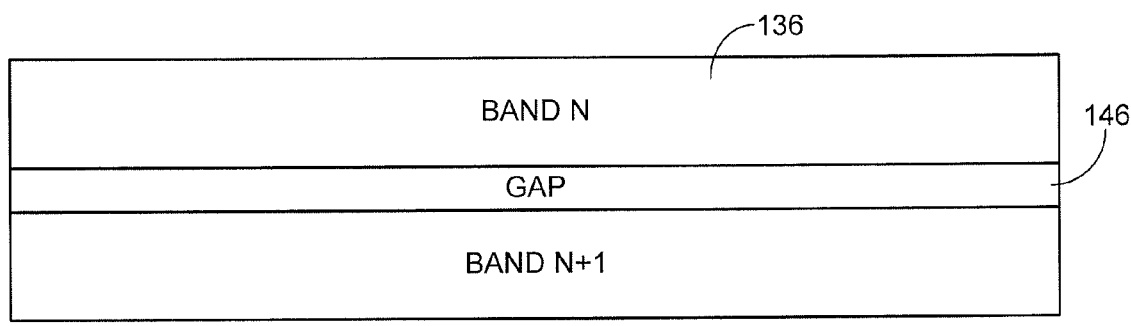
FIG. 5 illustrates bands of shingled data tracks.

FIG. 5 is a general representation of two bands 136 made up of respective numbers of shingled tracks 140 from FIG. 4. The bands are arbitrarily denoted as Band N and Band N+1. Each band 136 can have the same total number of tracks 140, or can have different respective numbers of tracks and accordingly, different radial widths. The bands 136 can be predefined or defined on-the-fly as new write data are supplied by the host.

A gap 146 is shown between the respective bands 136 and represents a discontinuity boundary between one band to the next. A similar gap will generally be provided between each adjacent pair of bands on each media surface. The position and width of the gap 146 are controlled in a manner to be discussed below. It will be appreciated that the gap 146 may be treated as a separate element by the control system or may be incorporated into one or other of the adjacent bands. In at least some embodiments, the gap 146 is significantly narrower than a single effective track width (e.g., less than the TW2 width 144 in FIG. 4).

Figure 6:
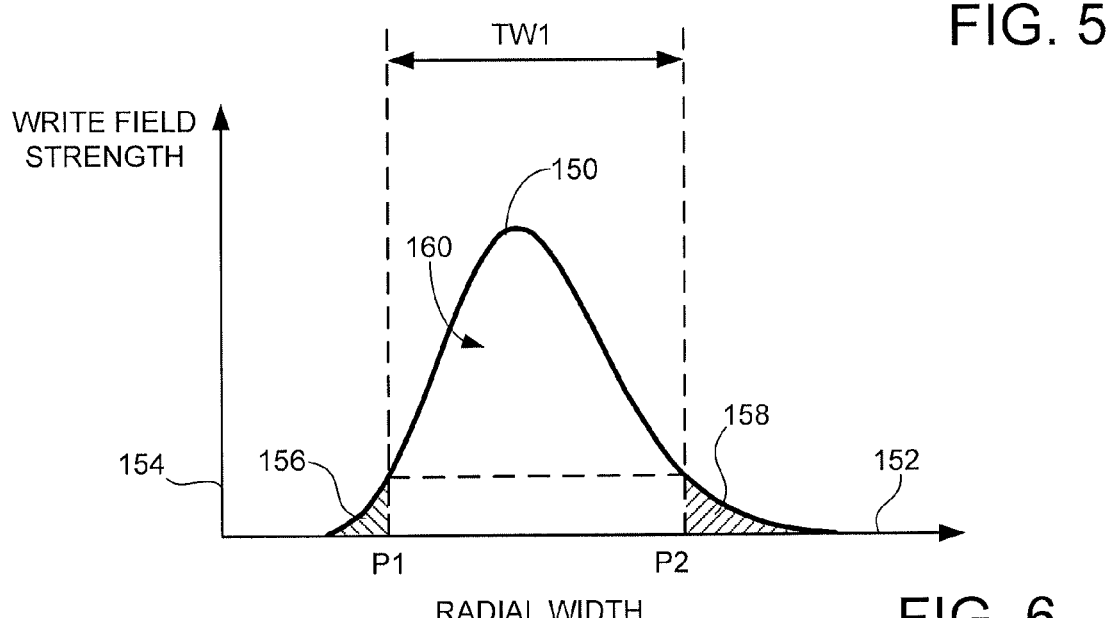
FIG. 6 is a graphical representation of an asymmetric write response of a write transducer.

FIG. 6 is a graphical representation of an asymmetric magnetic field write response 150 of the write element 122 in accordance with some embodiments. The asymmetric response 150 is plotted against a radial width (distance) x-axis 152 and a magnetic write field signal strength amplitude y-axis 154. The asymmetric response curve 150 is merely illustrative and can vary from one write element to the next, and may further vary with respect to radial position on the medium 116. Other shapes of write field response may be provided by different constructions of data transducers.

The asymmetric response curve 150 is skewed and has opposing tail portions 156, 158 beyond points P1 and P2. A portion 160 between points P1 and P2 generally corresponds to the effective width of each written track (e.g., TW1). The tail portions 156, 158 correspond to magnetic fringe field portions with a substantially weaker strength magnetic field as compared to the portion 160, but sufficient to, over time, degrade the current magnetization of the medium.

It can be seen from FIG. 6 that the first fringe field portion 156 represents a relatively narrower fringing field and the second fringe field portion 158 represents a relatively wider fringing field. It will be appreciated that the width of the area 160 is established by characteristics of the write element 122, and so may be wider than the effective read width of the read element 126. Accordingly, both the wider fringe field portion 158 and a portion of area 160 may be overwritten during SMR data write operations when shingling in the direction toward portion 158.

Figure 7:
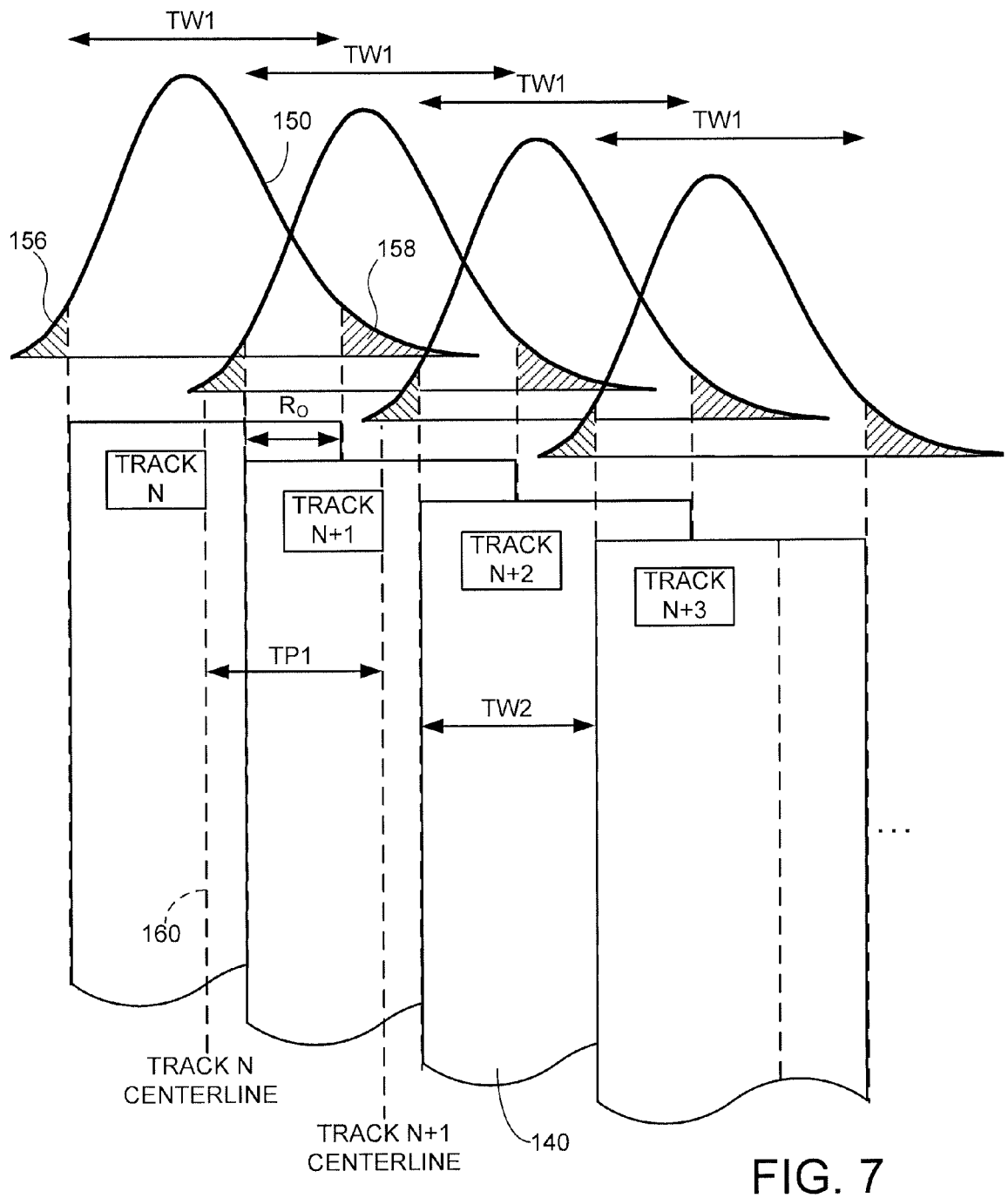
FIG. 7 depicts the writing of shingled tracks using a head having the asymmetric write response of FIG. 6.

FIG. 7 denotes tracks N through N+3 from FIG. 4 in conjunction with the write response curve 150 of FIG. 6 to illustrate the sequential writing of shingled tracks 140 in accordance with some embodiments. In this illustrative example, the track N+1 overlaps track N by a nominal radial distance $R_O$. As mentioned previously, each track is initially written with a width corresponding to the write element 122 (curve 150) during an initial revolution of the medium 116 and then partially overwritten by a following track during a subsequent revolution to provide the final track width TW2 (FIG. 4).

Each final track has a track centerline as denoted at 160, and the final tracks have a baseline track pitch (TP1) measured as the radial distance from one track centerline to the next. The track centerline 160 corresponds to the center of the originally written track (e.g., the centerpoint of width TW1). Although this centerline reference is offset from the "center" of the final written track, defining the centerline in this way provides a number of benefits including less complex controller firmware. Depending on the configuration of the system, the read element (126, FIG. 2) may be nominally positioned along the centerline 160 of each track during a read operation, or offsets may be applied so that the read element is advanced to more closely align with the "center" of the final written track.

It can be seen that the track pitch TP1 is nominally equal to the track width TW2. In turn, the final track width TW2 is generally equal to the difference between TW1 and $R_O$ (e.g., TW2=TP1=TW1−$R_O$).

Figure 8:
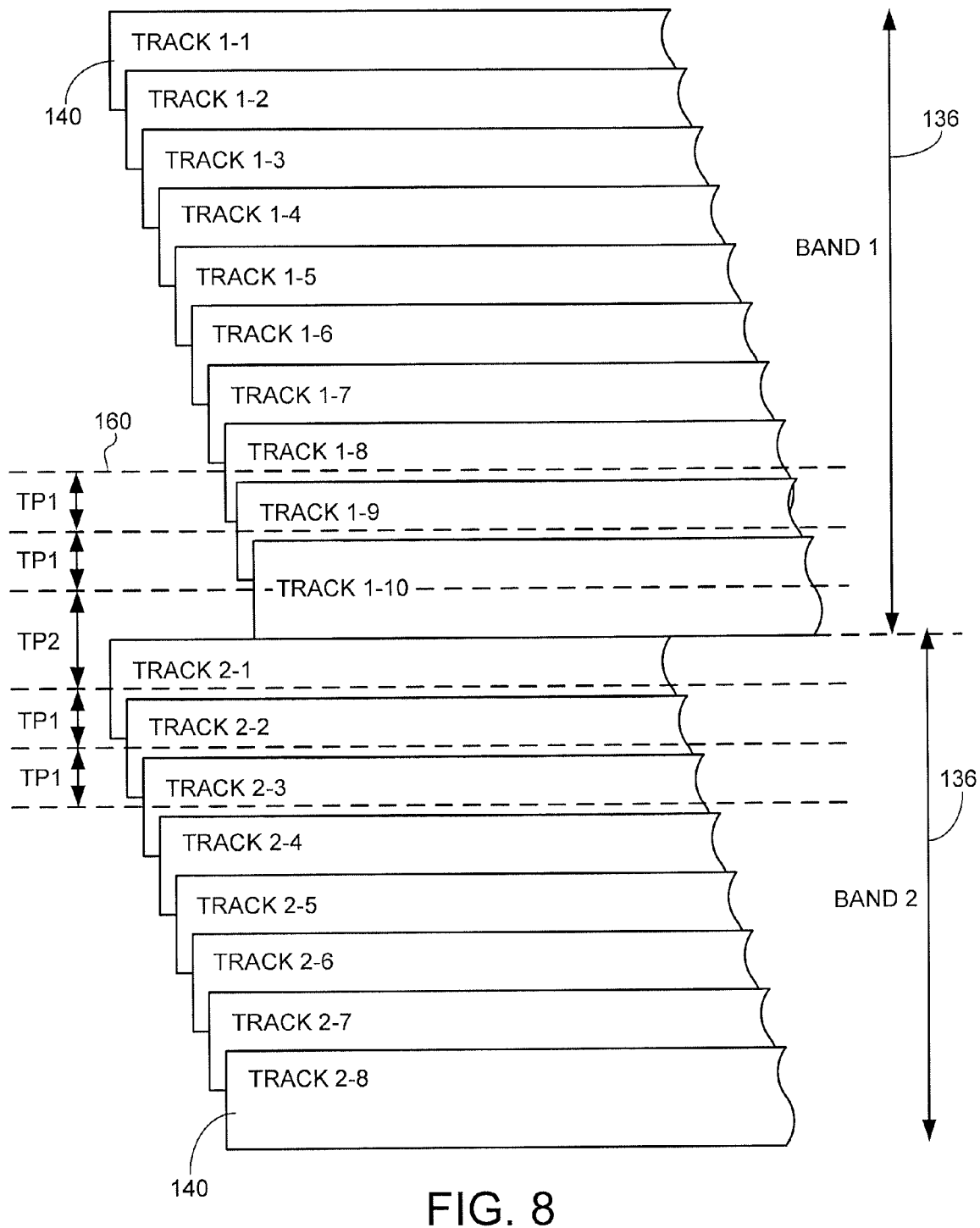
FIG. 8 depicts shingled magnetic recording to the medium of FIG. 3.

FIG. 8 illustrates two exemplary bands 136 of tracks 140 written using a uniform track pitch approach. The two bands are identified as Band 1 and Band 2. Band 1 includes a total of ten (10) tracks, and Band 2 includes a total of eight (8) tracks. Other numbers of tracks may be provided in each band. The tracks 140 in Band 1 are denoted as Track 1-1 to Track 1-10, and the tracks in Band 2 are denoted as Track 2-1 to Track 2-8.

The bands, and the tracks within each band, are written successively as shown, so that Track 1-1 is the first written track in Band 1 and Track 1-10 is the last written track in Band 1. Similarly, Track 2-1 is the first written track in Band 2 and Track 2-8 is the last written track in Band 2. At the commencement of the writing of Band 2, the first written track, Track 2-1, is written in such a way as to be offset from the last written track in Band 1, Track 1-10. In this way, Track 2-1 does not overlap Track 1-10.

This provides the system with two nominal track spacings (pitches). A first track pitch TP1, which constitutes a "normal" track pitch, is provided between each adjacent pair of the tracks in each band. An exception is a second track pitch TP2, which is the track pitch between the last track in a previous band (e.g., Track 1-10 in Band 1) and the first track in the next band (e.g., Track 2-1 in Band 2).

It will be understood that both Band 1 and Band 2 are written in the same direction with respect to the asymmetric response of the write element depicted in FIGS. 6 and 7, so that the portion of each overlapped track corresponds to the wider magnetic fringe field portion 158 from the write element. For example, subsequently written Track 1-10 overlaps that portion of previously written Track 1-9 that was exposed to the wider magnetic field portion 158 (and, in at least some embodiments, a portion of the area 160 in FIG. 6). This is also true for the remaining tracks in Band 1 and the tracks in Band 2.

In this approach, each band 136 is treated as a separate unit and access operations are carried out as required to manage the data within each band. A read operation upon data sectors along Track 2-5 would include a seek operation to place the read element 126 (FIG. 2) over the centerline 160 of Track 2-5, and then the transducing and recovery of the data therefrom as the data sectors pass adjacent the sensing element.

Write operations can be performed upon the tracks in each band, but care should be taken to avoid the inadvertent overwriting of valid data on an adjacent track. To write updated data to data sectors along Track 2-5, the device 110 may determine the status of the adjacent sectors on Track 2-6. If the data sectors are marked as stale, then in some cases the system may operate to simply perform a write operation to the sectors on Track 2-5.

Writing data to overlapped Track 2-5 may include a seek operation to position the write element in a controlled orientation relative to the width and radial position of Track 2-5, followed by the writing of data to the data sectors along the track. This will necessarily overwrite a portion of the adjacent Track 2-6, which should not be a problem if the affected data on Track 2-6 are no longer valid data. The absolute positions of the transducer 124 (FIG. 2) relative to the medium during such read and write operations may tend to be different in relation to the radial offset between the write and read elements 122, 126.

On the other hand, if the adjacent data sectors on Track 2-6 are still valid data, the system may take one of several steps to update the data on Track 2-5. In one approach, the system may read back the contents of the remaining tracks in the band (e.g., Tracks 2-5 through 2-8) and successively rewrite the data to these tracks along with the updated contents of Track 2-5.

In another approach, the new data for the data sectors on Track 2-5 may be written to a new available location within Band 2, such as an open location along Track 2-8 or by adding a new track (e.g., Track 2-9) to the band. If a new location is selected for the updated data, a new logical to physical association will be made by the system for the new location of the data sectors and the old version data sectors on Track 2-5 will be marked as stale (invalid data).

It follows that, although the data represented by the various tracks in FIG. 8 are written sequentially, it may be necessary from time to time to go back and rewrite the data to any given track within a particular band. This is one reason for providing a substantially non-overlapping relationship between the last track in Band 1 (e.g., Track 1-10) and the first track in Band 2 (Track 2-1); this ideally allows both Track 1-10 and Track 2-1 to be independently rewritten as required.

While operable, one limitation with this approach is that the first written track in each band may tend to have the worst read performance of any track in that band, and the last written track in each band may tend to have the best read performance of any track in that band. Using Band 2 as an example, Track 2-1 (the first written track) is encroached upon by both Track 1-10 and Track 2-2, so that Track 2-1 is "squeezed" by tracks in two opposite directions. The rest of the tracks in Band 2 (Tracks 2-2 through 2-8) are only encroached upon by a single track. Thus, while the approach of FIG. 8 can be used by the device 110 of FIG. 2, it is contemplated that such may be limited to data areas of the medium 116 that experience few or no write updates.

Figure 9:
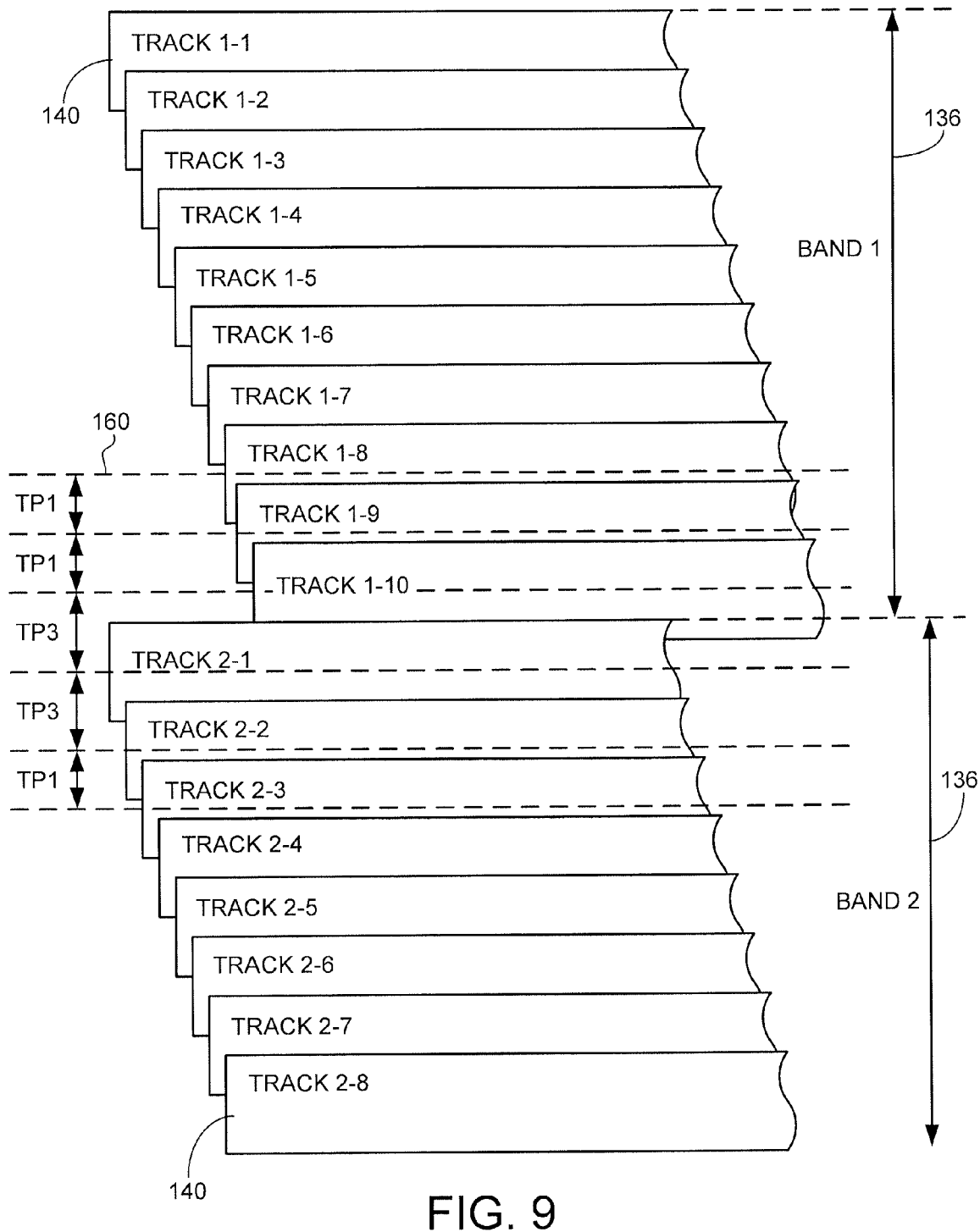
FIG. 9 depicts another approach for shingled magnetic recording to the medium.

FIG. 9 illustrates another approach to writing data using shingled magnetic recording techniques in accordance with the present disclosure. Generally, the same bands and tracks in FIG. 8 are illustrated in FIG. 9, and like reference numerals are used to denote similar arrangements.

In FIG. 9, Track 2-1, which is the first written track in Band 2, is radially moved in a direction away from the adjacent Track 2-2 and toward the last written track in Band 1, Track 1-10. Track 2-1 is thus caused to partially overlap Track 1-10. The remaining tracks are positioned as before in FIG. 8.

As illustrated in FIG. 9, the first written track Track 2-1 is moved so that the distance from the centerline of Track 2-1 to the centerline of Track 2-2 is nominally equal to the distance from the centerline of Track 2-1 to the centerline of Track 1-10. This provides a new track pitch TP3 which is shared between these three tracks.

Shifting Track 2-1 in this way may appear to be counterintuitive since the track continues to be encroached upon in two directions, as in FIG. 8. However, by maintaining Track 2-2 in its previous radial position, the final width of Track 2-1 becomes wider than in FIG. 8, thereby enhancing readback performance for the track. Track 1-10 is correspondingly made to be narrower than in FIG. 8 to the extent that it is partially overlapped by Track 2-1, but Track 1-10 is still wider than the remaining tracks in the band (apart from the first written track if such is applied thereto) and continues to enjoy better than normal readback performance. It is noted that, to the extent that the shifted Track 2-1 is encroached upon by subsequent writes to adjacent Track 1-10, the Track 2-1 will be subjected to the wider fringe field portion 158 of the write element as it writes to Track 1-10.

In sum, the illustrative embodiment of FIG. 9 shifts the first written track in the selected band so that the track pitch of the first written track and the second written track is nominally the same as the track pitch of the first written track and the last written track of the previous band (e.g., the distance between Track 2-1 and 2-2 is TP3, and the distance between Track 2-1 and Track 1-10 is also TP3).

This allows the system to operate with only two identified track pitch distances (e.g., TP1 and TP3), allowing for a relatively straightforward controller solution. By way of illustration, during normal write operations to intermediate tracks in a given band, the controller solution advances the write element during each subsequent pass to provide a final increment of TP1 between adjacent tracks. When writing the first track in the selected band, however, the write element is selected to be a distance TP3 away from the centerline of the overwritten last track in the previous band. Similarly, the write element is selected to be a distance TP3 away from the centerline of the first written track in the new band during the writing of the second written track in the new band. From that point forward, the normal track pitch TP1 is used for the rest of the tracks in the band.

While FIG. 9 only shows one track to be shifted, it is clear that the first track in Band 1 (e.g., Track 1-1) could also be shifted in a similar manner. Similarly, the first track in every band, or a portion of the bands, could be shifted as desired.

In another related embodiment, the first written track in a first band, such as Track 2-1, may or may not be advanced toward the last track in the next band (e.g. Track 1-10), but the remaining tracks in the first band (e.g., Tracks 2-2 through 2-8) will be advanced in a direction away from Track 2-1. This also provides a greater track pitch for the first two (or more) tracks in the band, as before. A limitation with this approach, however, is reduced data storage capacity on the medium since the overall radial width of the band is expanded. This technique might be useful in some applications, such as for some but not all bands on a given media surface.

In each case, it can be seen that as the data in Track 1-10 is rewritten, the adjacent Track 2-1 will be exposed to the wider magnetic fringe field portion 158 (see FIGS. 6-7). While this exposure may not materially affect the read performance of Track 2-1 after a relatively few number of writes, it is contemplated in some cases that, after a larger number of writes to Track 1-10, the data on Track 2-1 may become degraded.

Accordingly, in some embodiments a medium such as configured in FIG. 9 may be monitored over time. Once a selected number N updated writes are performed on Track 1-10, such as N=10, etc., the system may proceed to read back and rewrite each of the Tracks 2-1 through 2-8 (more generally, rewrite Band 2).

Other parametric measurements can be carried out as well. For example, a monitored bit error rate (BER), channel quality measurement, or other readback performance characteristic may be monitored for Track 2-1. Once the monitored characteristic reaches a predetermined threshold, Band 2 is rewritten.

In other embodiments, each time that the last written track in a band (e.g., Track 1-10 in Band 1) is written and/or updated after an initial write, the system proceeds to read the next adjacent first written track in the next band (e.g., Track 2-1). If the error rate performance from the first written track is determined to be degraded, the next band (e.g., Band 2) is rewritten.

Figure 10:
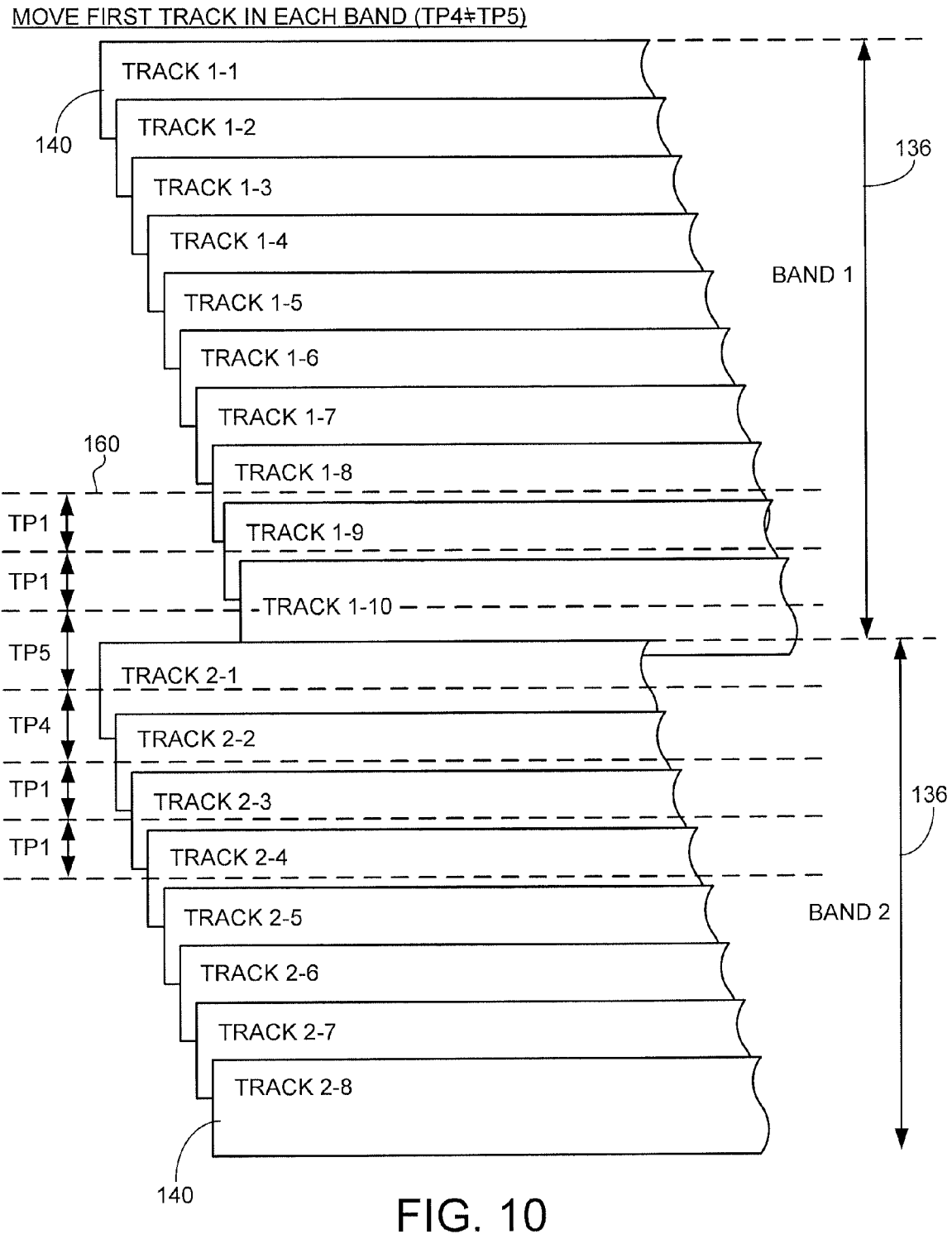
FIG. 10 shows another shingled magnetic recording approach.

FIG. 10 provides another approach to writing data using shingled magnetic recording techniques in accordance with the present disclosure. In the illustrative embodiment of FIG. 10, Track 2-1 in Band 2 is shifted toward Track 1-10 in Band 1 as before, but a smaller radial distance as compared to FIG. 9. This provides a total of three track pitch distances: TP1, which is the normal track spacing between intermediary pairs of tracks; TP4, which is the distance between Tracks 2-1 and 2-2; and TP5, which is the distance between Tracks 2-1 and 1-10. The distance TP4 is greater than TP1 and less than TP5, so that TP1<TP4<TP5. The amount of shift is less than in FIG. 9, so the distance TP5 is greater than TP3(TP5>TP3).

This alternative configuration allows the space between bands to be split between the last written track in the first band and the first two tracks in the second band. Track 2-1 in FIG. 10 is thus narrower in FIG. 10 as compared to FIG. 9, but is provided with less overlap with Track 1-10 and therefore should exhibit improved readback performance. It is contemplated that in both FIGS. 9 and 10, the amount of radial overlap $R_O$ for any adjacent pair of tracks exceeds the width of the wider fringe field portion 158 (see FIG. 7).

As before, the arrangement of FIG. 10 is by way of example and not limiting. As desired, Track 2-1 can be shifted such that TP4 is greater than TP5 (TP4>TP5). Track 1-1 in Band 1 may be shifted in a similar manner as desired. Other respective amounts of radial shift can be applied to the first track in each band, including different amounts of shift for different bands. Other tracks in each band, such as Track 2-2, may also be shifted. It is contemplated that the recording surface of the medium 116 (FIG. 3) may be configured to have some bands arranged as depicted in FIG. 8, other bands arranged as in FIG. 9 and still others arranged as in FIG. 10.

As discussed with the configuration of FIG. 9, parametric measurements can be carried out to assess degradation of Track 2-1 based on writes to Track 1-10, and Band 2 can be rewritten as required.

Figure 11:
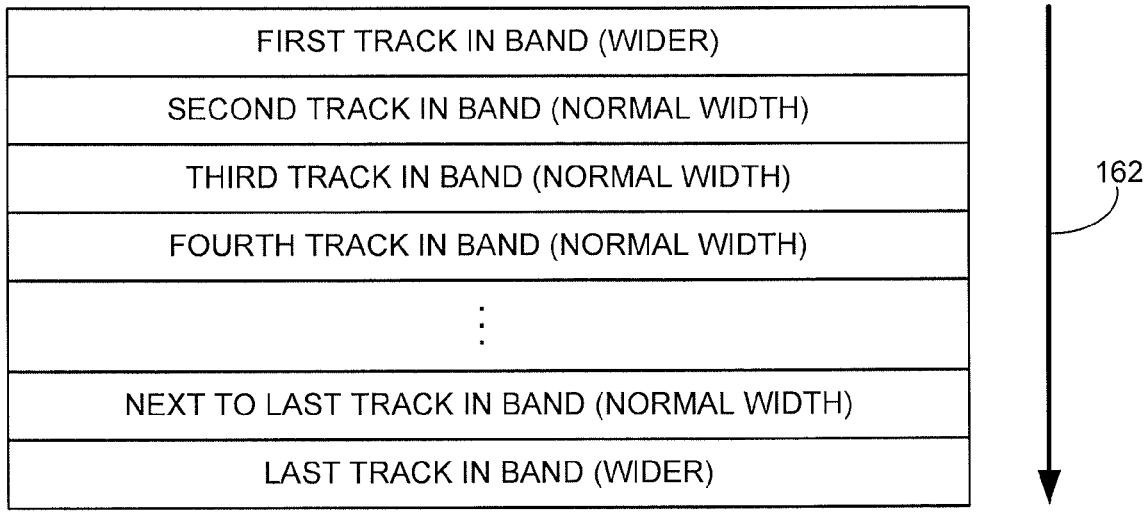
FIG. 11 provides another illustration of shingled magnetic recording using the techniques of FIGS. 9 and 10.

FIG. 11 is a schematic depiction of an example band 136 configured in accordance with the foregoing discussion. The first written track and the last written track in the band are wider than the remaining tracks in the band. The formatting of FIG. 11 can be applied to a single band, multiple bands or all of the bands on a given shingled magnetic recording medium.

The format of FIG. 11 can be applied irrespective of recording direction. A first band may be written so that subsequent tracks overlap in an inward radial direction and an immediately adjacent second band may be written so that the subsequent tracks overlap in an outward radial direction. Because the first and last tracks in each band are wider, some amount of overlap can be accommodated. Nevertheless, it is contemplated that in most cases, adjacent bands will be written in the same direction (e.g., arrow 162) and the movement of the first written track (and in some cases, the second written track) can accommodate multiple adjacent bands to be written in the same direction.

Figure 12:
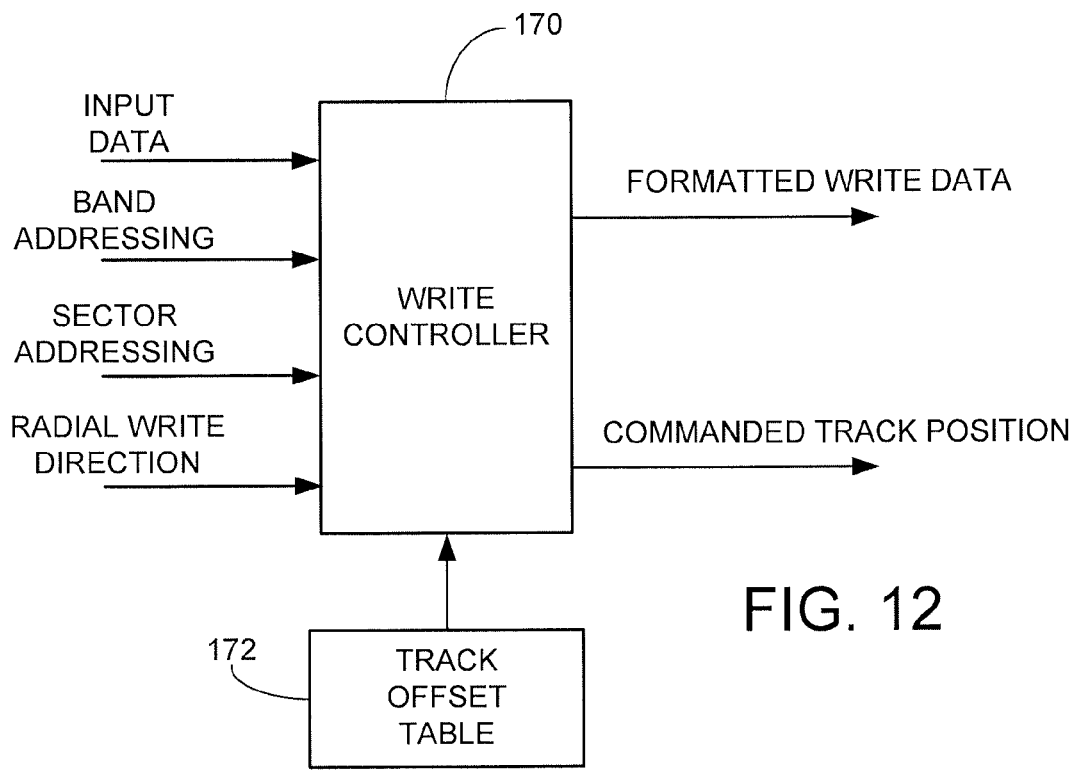
FIG. 12 depicts a write controller adapted to perform shingled magnetic recording in accordance with the embodiments of FIGS. 9 and 10.

FIG. 12 is a functional representation of a write controller 170 in accordance with some embodiments. The write controller can form a portion of the device 110 of FIG. 2 and can incorporate various aspects implemented in hardware and/or firmware. The write controller 170 generally operates to control the writing of data to bands as set forth above.

The write controller 170 utilizes a variety of inputs such as the input data to be written, band addressing information, sector addressing information, radial write direction information, etc. The write controller 170 additionally generates and uses track offset values from an offset table 172 in a suitable memory location. The table 172 can store various track pitch information values, such as the aforedescribed TP1-TP5.

Thereafter, during operation the write controller supplies formatted write data to the associated transducing head 124 and track adjustment signals for use in positioning the head using the VCM 132 (FIG. 2). In some cases, the write controller may command a radial position in terms of a radial servo increment which is supplied to the servo control system to position the head accordingly.

In some embodiments, the write controller 170 is adapted to measure the effective widths of the magnetic fringe fields to help set the appropriate offset values in the table 172 and to establish appropriate shingling directions for different locations on the medium. This can be carried out in a variety of ways. In one approach, The write controller 170 directs the writing of a track of data, such as the Track N+1 in FIG. 7, followed by the writing of an immediately adjacent track such as the Track N+2 shown in the same drawing. The amount of overlap (distance RO) is initially set at a minimal value.

A data read operation is carried out upon Track N+1 a successive number of times to generate a bit error rate (BER) or other readback metric. The read element may be positioned in a direction toward the boundary between Tracks N+1 and N+2 so that the read element is in the vicinity of any fringing effects of the write element during this operation.

A new Track N+2 is rewritten, this time with an incremented, greater amount of overlap and Track N+1 is again read a successive number of times to generate a new BER value or other readback metric. The foregoing sequence is repeated a successive number of times until change in readback performance beyond a predetermined threshold is detected. The radial width of the first fringe field on the side of the transducer at the junction of Tracks N+1 and N+2 can thereafter be determined in relation to the amount of radial overlap at this point.

The foregoing steps are then repeated, this time by writing the Track N+1, writing the immediately adjacent Track N with a minimal radial overlap and obtaining a readback metric for Track N+1. This continues until change in readback performance is detected. The radial width of the second fringe field on the side of the transducer at the junction of Tracks N and N+1 can thereafter be determined in relation to the amount of radial overlap at this point.

In at least some cases, the two fringe field widths will be different, enabling the system to determine the side having the relatively wider fringe field and the side having the relative narrower fringe field. The foregoing steps can be carried out at different radial locations on the medium to establish changes in fringe field width and, in some cases, transition of fringe field width from one side to the other.

In an alternative approach, only a single track is written and the read element is radially moved across the width of the track to obtain readback response at different locations of the track (e.g., in the middle of the track; incrementally closer to one side; incrementally closer to the other side). It would be expected that one side of the track would tend to exhibit a higher level of degradation in readback performance as compared to the other side, and the side with the greater degradation may be identified as the side having the wider fringe field.

The effective width of the read element can also be determined by the write controller 170 using the same or similar processing. Once these respective data sets are obtained, the system can be configured to write bands of tracks as described above in FIG. 11.

Figure 13:
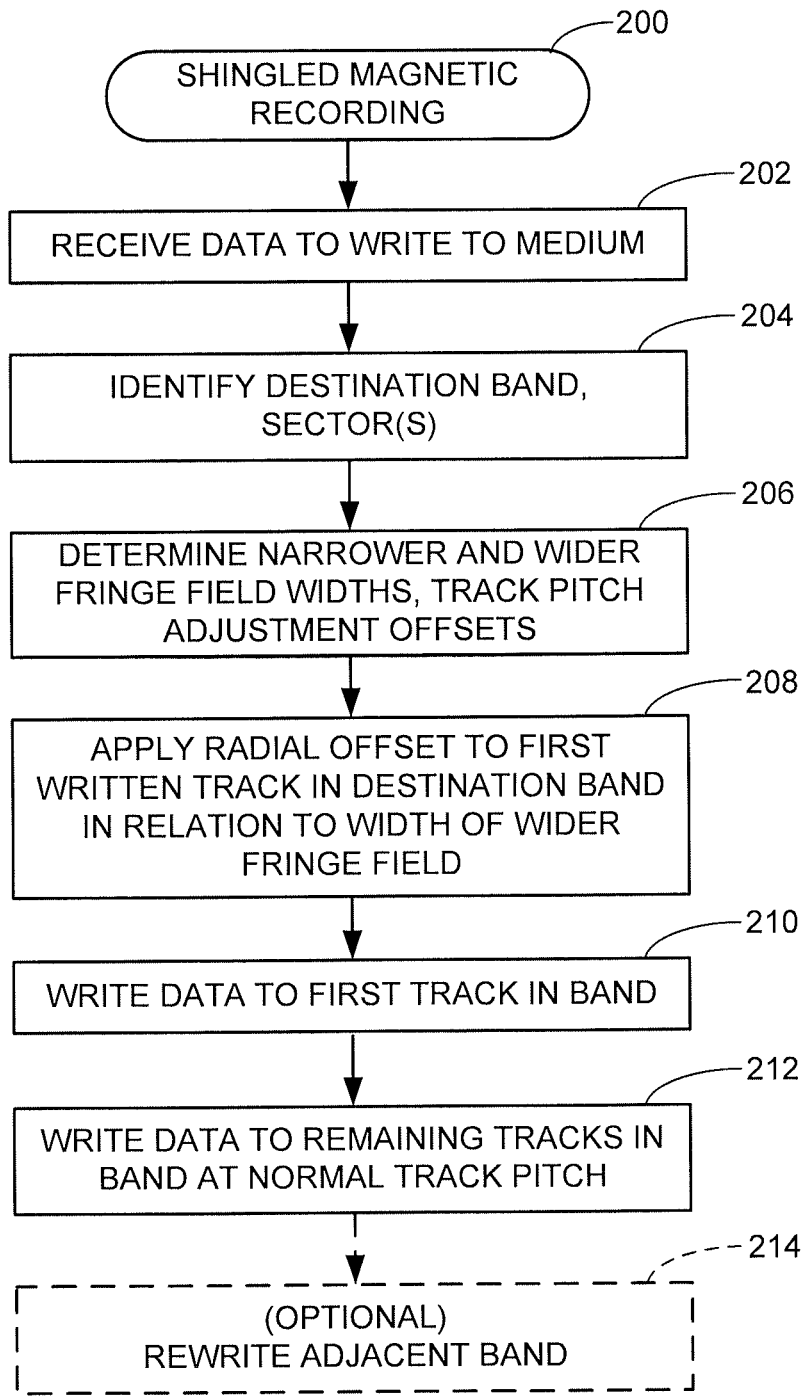
FIG. 13 is a flow chart for a shingled magnetic recording routine.

FIG. 13 is a flow chart for a shingled magnetic recording (SMR) routine 200 to illustrate the writing of data in accordance with the foregoing discussion. It will be contemplated for purposes of explanation that the routine is carried out by the device 110 of FIG. 2 to format bands of tracks as set forth in FIG. 11. Other routines can be used so that the various steps can be modified, omitted or carried out in a different ordering as desired.

Input write data to be written to the storage medium 116 are initially received at step 202. The destination band and destination sectors for the input write data are identified at step 204. The narrower and wider fringe field widths and track pitch adjust offsets are determined at step 206, such as by recalling these data sets from memory based on prior calibration testing discussed above.

A first radial offset is applied to the first written track in the destination band at step 208. This radial offset is set in a direction responsive to the wider fringe field and is in a direction away from the second written track in the band and toward the last written track in the immediately adjacent band. Once positioned, the input write data are written to the first track at step 210. This is illustrated in both FIGS. 9 and 10. The first radial offset provides a greater track pitch than a normal track pitch used for other tracks within the band.

If additional tracks are to be written, the write element is advanced to write additional tracks in the band at step 212 using the normal track pitch.

An optional step may be carried out at step 214 to rewrite the adjacent band (or a portion thereof). This can be carried out in a number of ways as discussed above responsive to parametric metrics associated with the system. In some embodiments, once the last track in a first band (e.g., Track 1-10 in FIGS. 9 and 10) has been written, the system can automatically schedule the rewriting of all of the tracks in the next band (e.g., Tracks 2-1 through 2-8). Alternatively, the rewriting of the next band can be carried out after N writes to the last track in the preceding band, where N is a plural number. In other embodiments, periodic measurements of the first written track in each band (e.g., Track 2-1) can be carried out after a number of writes have been carried out to the adjacent last track (e.g., Track 1-10), and the band can be rewritten as needed. In still other embodiments, each time the last track in a given band is written, the adjacent first written track in the next band can be read and, if readback performance is degraded, the next band can be rewritten. Other compensation strategies can be employed in view of the present disclosure.

It will now be appreciated that the various embodiments disclosed herein can provide a number of benefits. SMR applications can define a plurality of bands of tracks, with at least the first written track and the last written track in each band having a wider track width than remaining tracks in the band. This can provide increased readback performance margin for the first track in the band.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
positioning a transducer adjacent a recording medium; and
using the transducer to write data to the medium in the form of partially overlapping tracks grouped together into bands, a centerline of at least one track in a selected band being located on the recording medium relative to a centerline of an immediately adjacent track in the selected band so that the first track and an immediately adjacent second track in the selected band are separated by a first track pitch distance greater than a second track pitch distance between the second track and an immediately adjacent third track in the selected band.

2. The method of claim 1, in which the first track has an overall circumferential length around a central rotational axis of the medium, and the first track is partially overlapped by the second track over an entirety of the overall circumferential length of the first track.

3. The method of claim 2, in which the first track partially overlaps a last track in an adjacent band, and in which a first radial distance from a written centerline of the first track to a written centerline of the second track is nominally equal to a second radial distance from the written centerline of the first track to a written centerline of the last track in an adjacent band.

4. The method of claim 1, in which the using step comprises sequentially writing data to the first track in the selected band, writing data to the immediately adjacent second track in the selected band so that the second track partially overlaps the first track, and writing data to the immediately adjacent third track in the selected band so that the third track partially overlaps the second track, wherein the first track pitch distance between the first and second tracks is the overall radial distance between the written centerline of the first track and the written centerline of the second track, and wherein the second track pitch distance between the second and third tracks is the overall radial distance between the written centerline of the second track and the written centerline of the third track.

5. The method of claim 1, in which the first track is partially overlapped by another track in the selected band, and the last track is partially overlapped by another track in a different band.

6. The method of claim 1, in which the write transducer has a narrower fringe field on a first radial side and a wider fringe field on an opposing second side, and the tracks in the selected band are successively partially overwritten in a radial direction corresponding to the wider fringe field.

7. The method of claim 1, in which the using step comprises writing shingled data tracks to a second selected band immediately adjacent the selected band so that the first written track in the selected band partially overlaps a last written track in the second selected band.

8. The method of claim 7, in which the write transducer has a narrower fringe field on a first radial side and a wider fringe field on an opposing second side, and a radial distance of overlap of the first written track of the selected band is greater than a radial width of the wider fringe field.

9. The method of claim 7, further comprising rewriting each of the tracks in the selected band responsive to the writing of data to an immediately adjacent last written track in the second selected band a selected N times, where N is a plural integer.

10. An apparatus comprising:
a recording medium;
a transducer adapted to store data to the medium in the form of tracks grouped together into concentric bands; and
a write controller adapted to position the transducer to sequentially write data from a first track to a last track in a selected band so that each successive track in the selected band partially overlaps an immediately previously track, the write controller radially moving a centerline of at least one track in the selected band so that the first track and a second track partially overlapping the first track in the selected band are separated by a first track pitch distance greater than a second track pitch distance between the second track and a third track partially overlapping the second track in the selected band to provide each of the first and last tracks with a radial width greater than a radial width of each of the second and third tracks.

11. The apparatus of claim 10, in which adjacent pairs of the remaining tracks in the selected band are separated by the second track pitch distance, and the write controller adjusts a radial location of the first track in a radial direction away from the remaining tracks to provide the first track pitch distance.

12. The apparatus of claim 11, in which the write controller further operates to adjust the radial location of the first track to establish said first track pitch distance between the first track and a last track in an adjacent band.

13. The apparatus of claim 10, in which the transducer has a narrower fringe field on a first radial side and a wider fringe field on an opposing second side, and the tracks in the selected band are successively partially overwritten in a radial direction corresponding to the wider fringe field.

14. The apparatus of claim 13, in which the write controller overlaps successive tracks in a first band adjacent an outermost diameter of the medium in a first radial direction, and overlaps successive tracks in a second band adjacent an innermost diameter of the medium in an opposing second radial direction.

15. The apparatus of claim 10, in which the selected band is a first band, and the controller is further adapted to write data to a second band immediately adjacent the first band from a first track to a last track in the second band so that each successive track in the second band partially overlaps an immediately previously track in said band, the first track and the last track each having a radial width that is greater than a radial with of remaining tracks in the selected band, and the first track in the first band partially overlaps the last track in the second band.

16. The apparatus of claim 15, in which the transducer has an asymmetric write response with a narrower fringe field on one side and a wider fringe field on an opposing second side, wherein the first track in the first band overlaps the last track in the second band by a radial distance greater than a width of the wider fringe field.

17. The apparatus of claim 10, in which the transducer is further adapted to read back data from the selected band, the transducer having a magnetic sensor with an effective magnetic sensor width less than or equal to the width of the partially overlapped tracks in the selected band, a read controller of the apparatus applying a radial offset to the magnetic sensor so that a center of the magnetic sensor is offset from a written centerline of each of the tracks in the selected band.

18. An apparatus comprising:
a recording medium adapted for rotation about a central axis;
a write element adapted to store data to the medium in tracks grouped together into adjacent concentric bands, the write element providing asymmetric fringing fields on opposing sides of the element comprising a narrower fringing field on a first side and a wider fringing field on an opposing second side; and
a controller adapted to position the write element to sequentially write data from a first track to a last track in a selected band so that each successively written track in the selected band partially overlaps an immediately previously written track, the controller moving a centerline of the first track away from the second track by a distance greater than a radial width of the wider fringing field so that the first track and the second track in the selected band are separated by a first track pitch distance greater than a second track pitch distance between the second track and the third track in the selected band.

19. The apparatus of claim 18, in which adjacent pairs of the remaining tracks in the selected band are separated by the second track pitch distance and the first and last tracks in the selected band each have a radial track width that is greater than a radial width of the remaining tracks in the selected band.

20. The apparatus of claim 18, in which the controller further operates to write a second selected band immediately adjacent the selected band from a first track to a last track with each successively written track partially overlapping an immediately previously track, wherein the first track in the selected band partially overlaps the last track in the second selected band by a radial distance greater than the width of the wider fringing field.

* * * * *

UNITED STATES PATENT AND TRADEMARK OFFICE
CERTIFICATE OF CORRECTION

PATENT NO. : 8,867,161 B2  
APPLICATION NO. : 13/835628  
DATED : October 21, 2014  
INVENTOR(S) : Bruce Emo and Ken R. Burns It is certified that error appears in the above-identified patent and that said Letters Patent is hereby corrected as shown below:

In the Claims

In Col. 14, Line 32, Claim 20,
replace "previously"
with "previous"

Signed and Sealed this
Nineteenth Day of May, 2015

Michelle K. Lee
*Director of the United States Patent and Trademark Office*